United States Patent [19]

Heiland

[11] Patent Number: 5,237,869
[45] Date of Patent: Aug. 24, 1993

[54] LOAD SENSING DEVICE

[75] Inventor: Manfred Heiland, Darmstadt, Fed. Rep. of Germany

[73] Assignee: Carl Schenck AG, Fed. Rep. of Germany

[21] Appl. No.: 713,972

[22] Filed: Jun. 11, 1991

[30] Foreign Application Priority Data

Jun. 11, 1990 [EP] European Pat. Off. ........ 90110976

[51] Int. Cl.[5] .............................................. G01M 1/02
[52] U.S. Cl. ................................. 73/477; 73/862.382
[58] Field of Search ................. 73/462, 471, 473, 475, 73/476, 477, 862.52, 862.65, 862.382, 862.632, 862.633, 862.637, 862.638

[56] References Cited

U.S. PATENT DOCUMENTS

| | | | |
|---|---|---|---|
| 2,785,572 | 3/1957 | Bokorney | 73/477 |
| 3,182,511 | 5/1965 | Federn et al. | 73/477 |
| 3,252,332 | 5/1966 | Senger | 73/471 |
| 4,083,236 | 4/1978 | Steinmueller | 73/862.52 |
| 4,196,784 | 4/1980 | Suzuki et al. | 73/862.65 |
| 4,406,164 | 9/1983 | Hines et al. | 73/476 |
| 4,466,296 | 8/1984 | Keyes | 73/862.65 |
| 4,655,306 | 4/1987 | Saner | 73/862.65 |

FOREIGN PATENT DOCUMENTS 1237807  3/1967 Fed. Rep. of Germany.
7801587  7/1985 Fed. Rep. of Germany.

*Primary Examiner*—John E. Chapman
*Attorney, Agent, or Firm*—Connolly & Hutz

[57] ABSTRACT

A load sensing device comprises a support mounted on a foundation, and a bridge connected to the support. The bridge is connected to a transducer. In order to ensure that the same transducer can be used for all sizes of supports in a particular series of supports, or for all loads to be measured, the transducer is flexibly connected to the support, and the stiffness of the connection between the bridge and the support and the stiffness of the flexible connection between the transducer and the support are both selected so that the load exerted upon the transducer always lies within a predetermined load range.

8 Claims, 1 Drawing Sheet

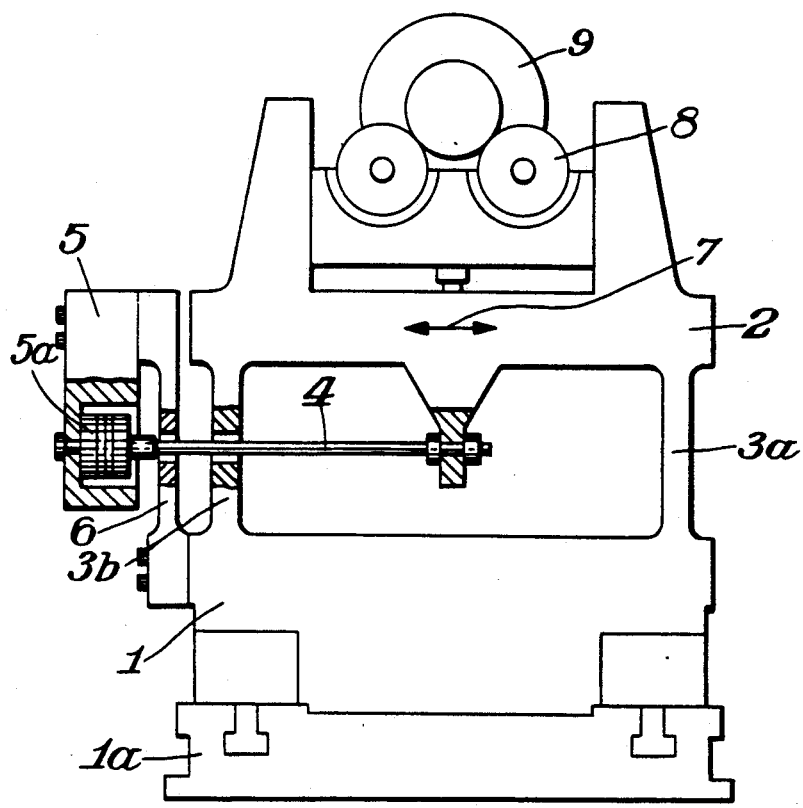
Fig.1.
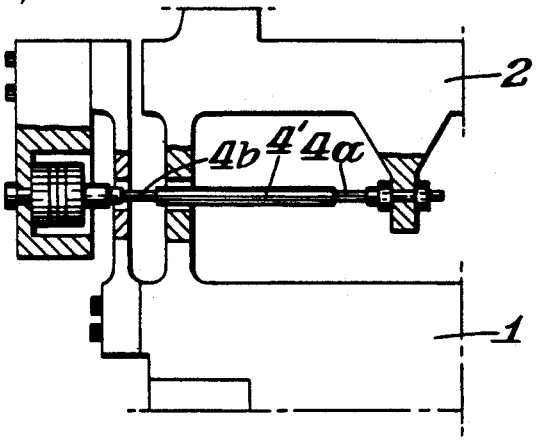
Fig.3.
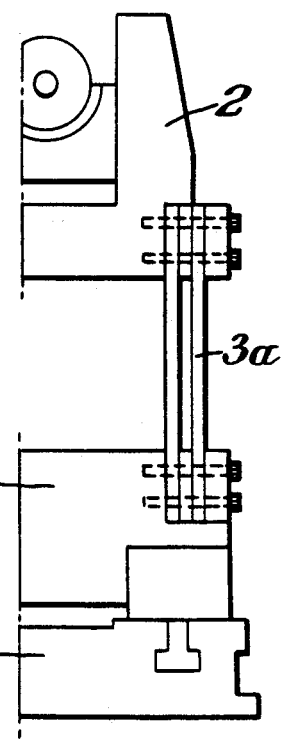
Fig.2.
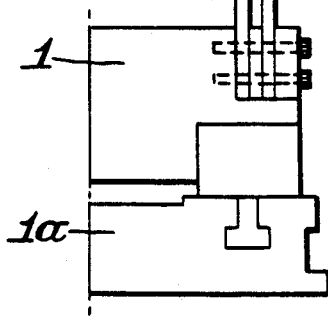

LOAD SENSING DEVICE

BACKGROUND OF THE INVENTION

The present invention relates to a load sensing device.

Load sensing devices are employed, for example in support assemblies of balancing machines, and a load sensing device of this type is described in West German Patent 1,237,807. With known load sensing devices, the bridge, its spring mounting and the supports are designed as a one-piece unit and the transducer is affixed, for instance in the rear, to a leaf spring bracket which is rigidly attached to the support.

The structural design of a load sensing device according to the above-mentioned patent essentially predetermines the range of the forces to be measured. If load cells are used having different measuring ranges, it might be possible to adapt the load sensing device to the forces to be measured by one means or another. However, from an economic viewpoint, this would be is an extremely unsatisfactory process.

SUMMARY OF THE INVENTION

Accordingly, an object of the present invention is a load sensing device suitable for measuring loads of greatly differing orders of magnitude without having to replace the transducer.

By selecting the stiffness of the connection between the support and the bridge as well as the stiffness of the connection between the support and the transducer, the invention divides the load flow from the bridge to the foundation into two load paths, thus causing the load which is exerted upon the transducer to lie always in a defined range. It is assumed that a load which is exerted upon the bridge in the measuring direction remains below a certain value.

The above-mentioned levels of stiffness can be designed for a series of load sensing devices in such a way that the same transducer can be used for all sizes in this series, thus making this system highly economical in terms of manufacturing and inventory.

In a preferred embodiment of the invention, the stiffness of the connection between the bridge and the support and/or the stiffness of the connection between the transducer and the support can be varied. As a result, the load sensing device of a certain dimension can be adapted to the load to be measured by means of changing the springs. In order to prevent incorrect measurements as a result of transverse load components, a preferred embodiment of the invention has a rod flexure of high transverse flexibility arranged in the connection between the transducer and the bridge. This effect can also be achieved by using a rod with articulated mountings or flexible points.

In the load sensing device according to the present invention, the transducer is designed as a load cell. By selecting the spring stiffness of the mounting bracket accordingly, it is possible to maintain the load exerted upon the transducer as well as the displacement which occurs at the transducer within a certain pre-specified range. If leaf springs or leaf spring assemblies are employed as flexible elements, the adaptation of the spring stiffness can be accomplished very easily. The load sensing device according to the invention is especially well suited for use in balancing machines.

BRIEF DESCRIPTION OF THE DRAWING

Novel features and advantages of the present invention in addition to those noted above will become apparent to persons of ordinary skill in the art from a reading of the following detailed description in conjunction with the accompanying drawing wherein similar reference characters refer to similar parts and in which:

FIG. 1 is an elevational view of a load sensing device, according to the present invention, with portions broken away to show interior details;

FIG. 2 is a partial elevational view showing details of leaf spring assemblies, according to the present invention; and FIG. 3 is a partial elevation view with portions broken away illustrating details of a modified rod interconnecting the bridge and the load cell.

DETAILED DESCRIPTION OF THE INVENTION

Referring in more particularity to the drawing, FIG. 1 shows the use of a load sensing device according to the invention in a balancing machine. The device essentially consists of a support 1 mounted on a suitable foundation 1a and a bridge 2 connected to the support by flexible elements 3a and 3b. The bridge includes bearings 8 for holding a rotor 9 to be balanced. The stiffness of the flexible elements 3a and 3b is designed in such a way that it allows the bridge 2 to move in a measuring direction with respect to the support 1 as indicated by the double arrow 7. The unbalance of a rotating rotor supported by the bridge 2 produces vibrations of the bridge 2 in the measuring direction.

The bridge 2 is connected to a load cell 5 by a rod 4. This load cell 5 is located inside a transducer housing 5a which, in turn, is connected to the support 1 by a bracket designed in the form of a leaf spring 6. The housing of the load cell 5 attached to the upper end of the leaf spring 6 faces in a downward direction. The connection is made in such a way that the exertion of the load leads to a parallel shifting of the load cell. Thus, the load cell is located in a secondary load flow.

In the illustrated embodiment, the spring stiffness of the flexible elements 3a and 3b has been designed in such a way that the adaptation of the load portion which passes through the secondary load flow is determined by selecting the corresponding leaf spring bracket 6. The adaptation of the load measuring range can be done, for instance, by employing leaf springs or leaf spring assemblies, such as shown in FIG. 2, having different stiffnesses.

Since the spring stiffness of the flexible elements 3a and 3b has to absorb the largest portion of the load, the stiffness is usually preestablished by design. Should it become necessary in certain cases, it is possible to design these spring elements so as to be replaceable, especially in the form of leaf springs as shown in FIG. 2.

By selecting the corresponding levels of spring stiffness, the load flow passing through the load cell is determined.

Modified rod 4' can be dimensioned in such a manner that it cannot transmit any transverse loads (see FIG. 3). This ensures that only load components in the measuring direction are transmitted to the load cell. Moreover, since the joints in the rod must be free from play, spring or flexible joints 4a, 4b are preferably used, such as for example constrictions on the rod.

The transducer may comprise a load cell which measures the load being exerted by strain-measuring gauges. Alternatively, the transducer may comprise a piezo element.

What is claimed is:

1. A load sensing device comprising a support mounted on a foundation, a bridge constructed and arranged to support a rotor to be balanced, the bridge being connected to the support by flexible elements, a load transducer connected to the bridge, a flexible connection between the load transducer and the support, and the flexible elements between the bridge and the support as well as the flexible connection between the load transducer and the support having a stiffness with respect to each other such that a load exerted upon the load transducer is within a predetermined load range.

2. A load sensing device as in claim 1 wherein the stiffness of the flexible elements between the bridge and the support and/or the stiffness of the flexible connection between the load transducer and the support is variable.

3. A load sensing device as in claim 1 wherein the flexible elements and the flexible connection comprise individual spring positioned in series.

4. A load sensing device as in claim 1 wherein the flexible connection between the load transducer and the support comprises a leaf spring.

5. A load sensing device as in claim 4 wherein the leaf spring is attached to the support and the load transducer by detachable connections.

6. A load sensing device as in claim 1 including a rod having high transverse flexibility connecting the bridge with the load transducer.

7. A load sensing device as in claim 1 including a rod with articulated mountings or flexible points connecting the bridge with the load transducer.

8. A load sensing device as in claim 1 wherein the flexible elements between the bridge and the support include at least one replaceable leaf spring.

* * * * *